Oct. 19, 1965    J. B. McCORMICK ETAL    3,212,379
MICROTOME HAVING MEANS TO INCREMENTALLY FEED THE
CUTTING BLADE TOWARD THE SPECIMEN CARRIER
Filed Oct. 26, 1962    3 Sheets-Sheet 1
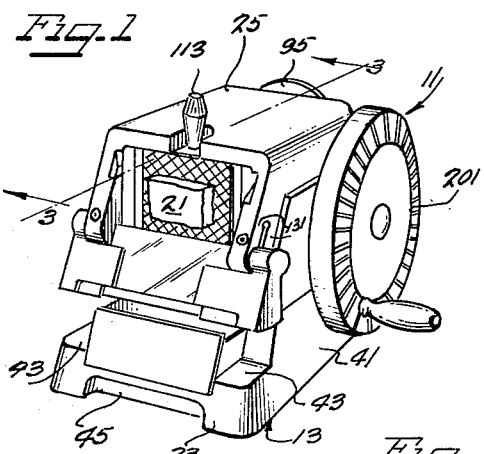
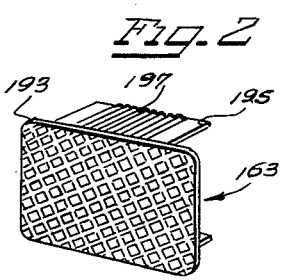
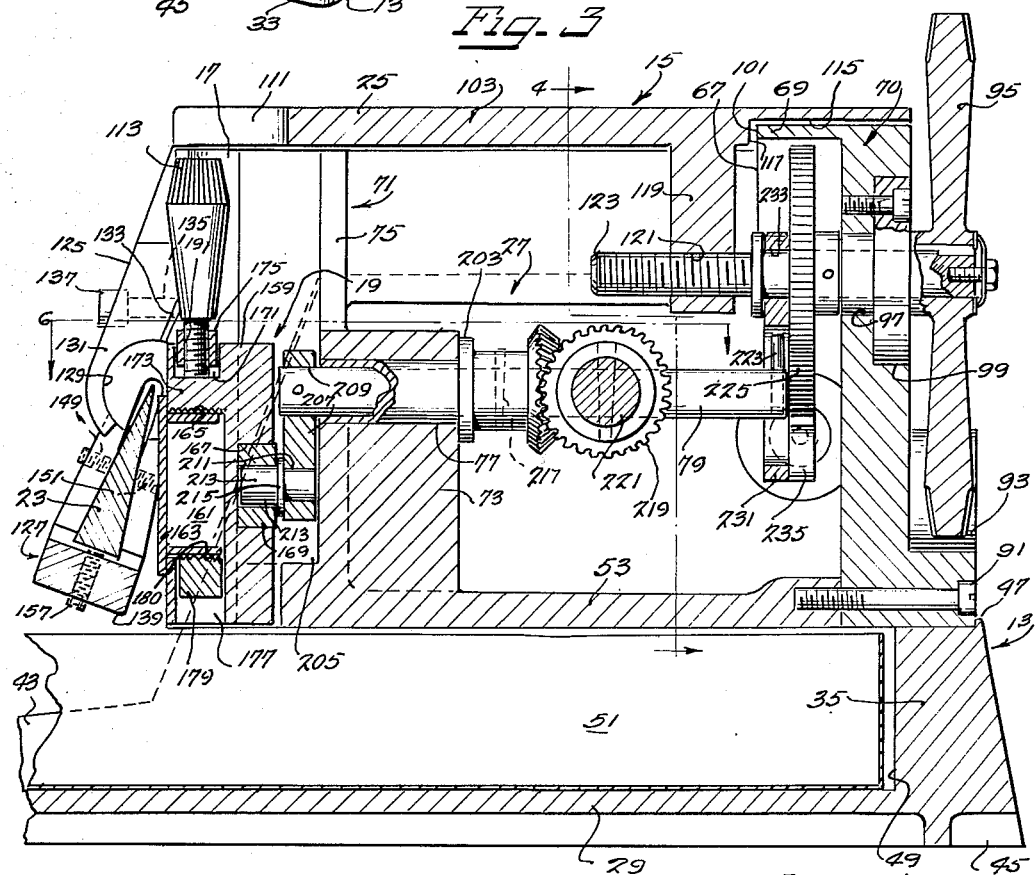
Inventors
JAMES B. McCORMICK
HARRY COUSINS
By Soans, Anderson, Luedeka & Fitch
Attys

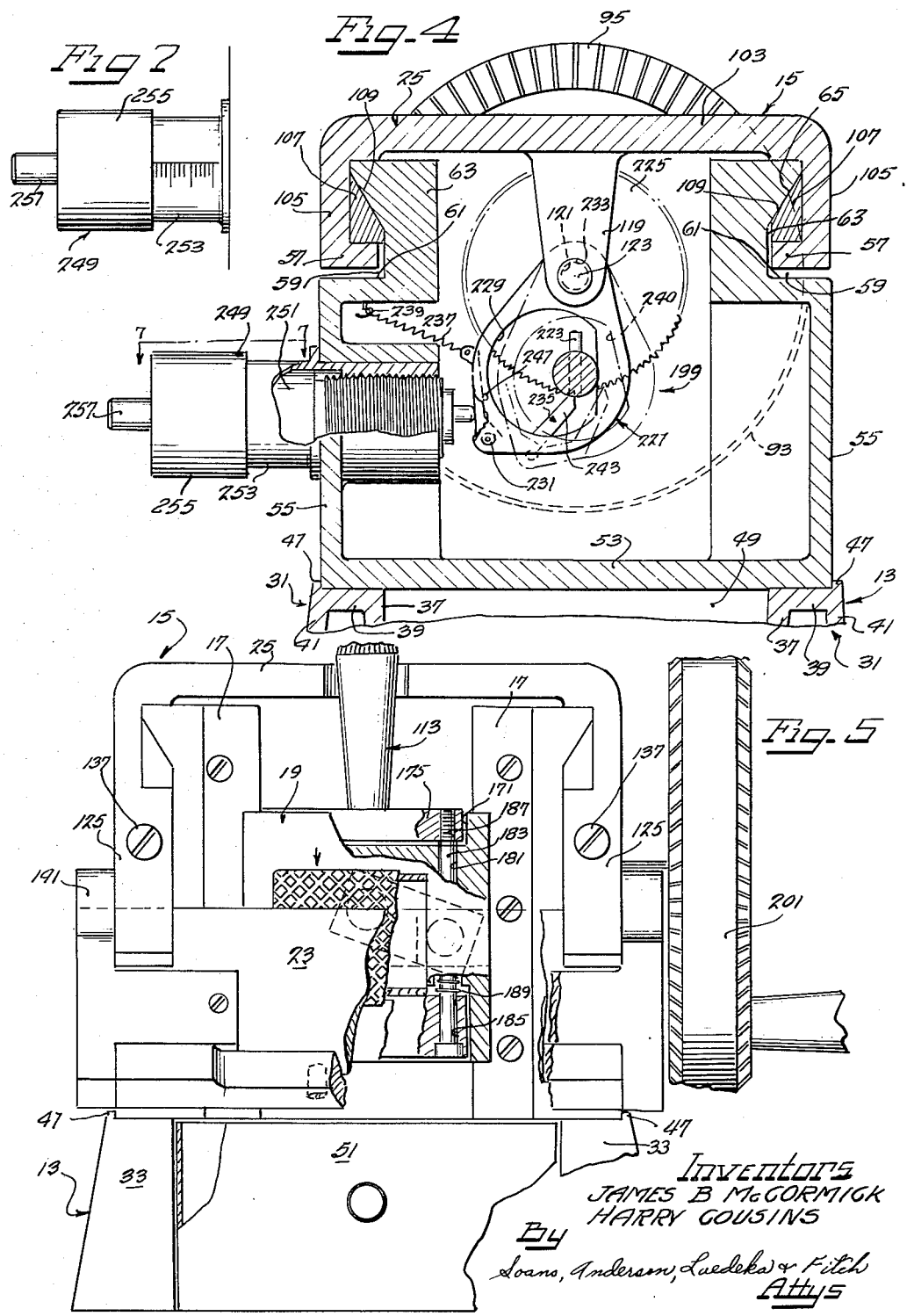

Oct. 19, 1965     J. B. McCORMICK ETAL     3,212,379
MICROTOME HAVING MEANS TO INCREMENTALLY FEED THE
CUTTING BLADE TOWARD THE SPECIMEN CARRIER
Filed Oct. 26, 1962                  3 Sheets-Sheet 3
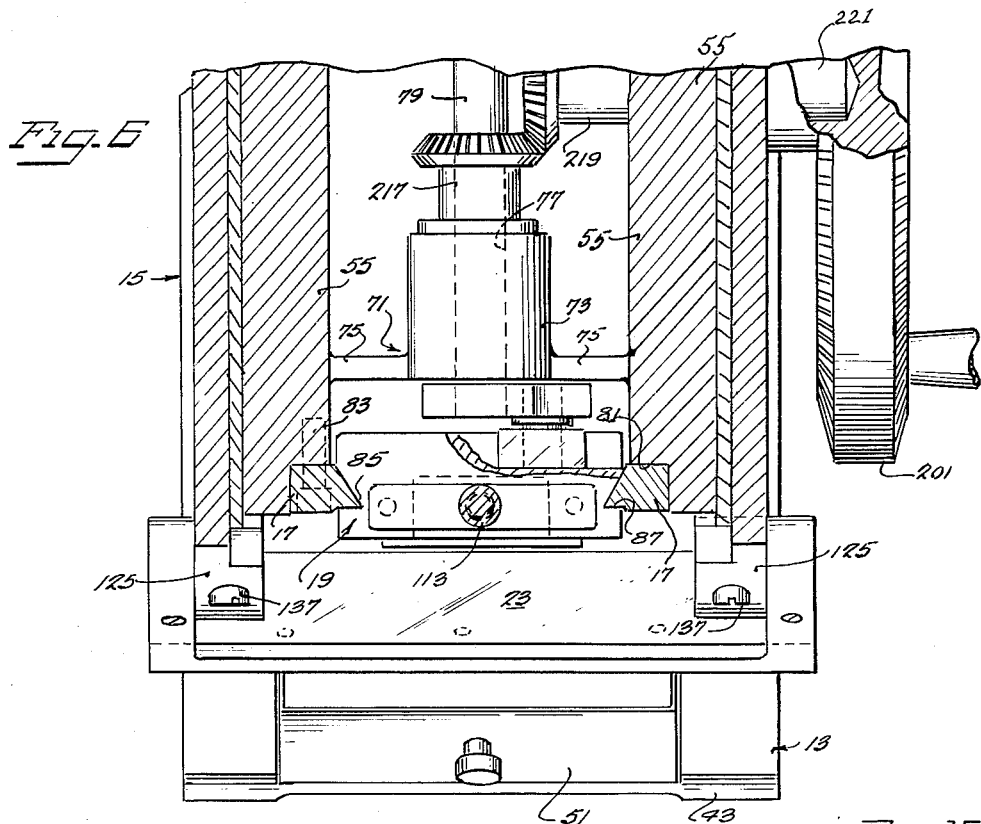
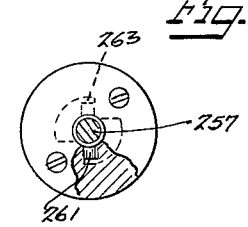
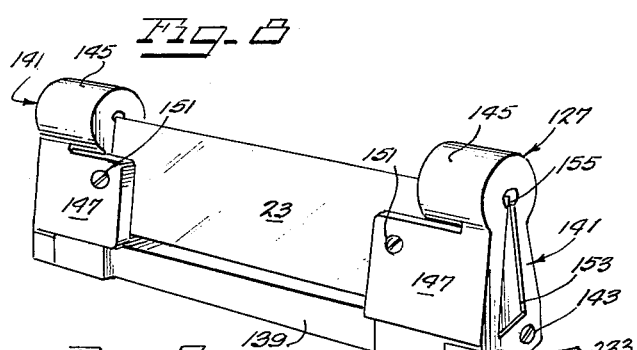
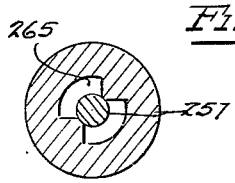
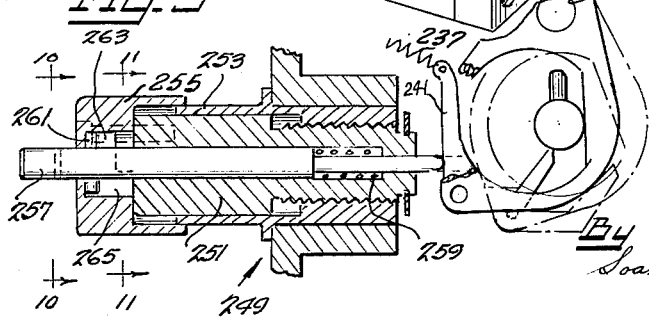
Inventors
JAMES B. McCORMICK
HARRY COUSINS
By Soans, Anderson, Luedeka & Fitch
Attys United States Patent Office 3,212,379
Patented Oct. 19, 1965

3,212,379
MICROTOME HAVING MEANS TO INCREMENTALLY FEED THE CUTTING BLADE TOWARD THE SPECIMEN CARRIER
James B. McCormick, La Grange, and Harry Cousins, Lemont, Ill., assignors, by direct and mesne assignments, to Ames Lab-Tek, Inc., a corporation of Massachusetts
Filed Oct. 26, 1962, Ser. No. 233,355
12 Claims. (Cl. 83—167)

This invention relates to microtomes, and has for its principal object the provision of a microtome having an improved construction.

An additional object of the invention is the provision of a microtome having means for supporting a cutting blade in an improved manner.

A further object of the invention is the provision of a microtome having an operating mechanism so constructed as to eliminate lost motion between a reciprocating specimen carrier and the elements which drive the carrier.

A still further object of the invention is the provision of a microtome having an improved mechanism for effecting incremental feeding movement of a cutting blade in the direction of a specimen carrier.

Another object of the invention is the provision of a microtome having means for effecting rapid adjusting movement of a cutting blade toward and away from a specimen carrier.

Still another object of the invention is the provision of a microtome which includes a movable chuck and improved means for clamping the specimen carrier to the chuck.

Other objects and advantages of the invention will become apparent with reference to the following description and the accompanying drawings.

In the drawings:

FIGURE 1 is a perspective view of a microtome showing various of the features of the invention;

FIGURE 2 is a perspective view of a specimen carrier adapted to be secured to a movable chuck of the microtome of FIG. 1;

FIGURE 3 is a fragmentary sectional elevational view taken along line 3—3 of FIG. 1;

FIGURE 4 is a fragmentary sectional elevational view taken along line 4—4 of FIG. 3;

FIGURE 5 is a fragmentary partially broken-away front view of the microtome of FIG. 1;

FIGURE 6 is a fragmentary sectional plan view taken along line 6—6 of FIG. 3;

FIGURE 7 is a fragmentary view taken in the direction of the arrows 7—7 of FIG. 4;

FIGURE 8 is an enlarged perspective view of the cutting blade holder of the microtome of FIG. 1;

FIGURE 9 is an enlarged elevational view, partially in section, of a portion of the microtome shown in FIG. 4;

FIGURE 10 is a partially broken-away sectional view taken along line 10—10 of FIG. 9; and FIGURE 11 is a sectional view taken along line 11—11 of FIG. 9.

Very generally, the microtome 11 of the illustrated embodiment is supported on a base 13 and comprises a box-like housing 15, the forward portion of which is provided with a pair of upstanding horizontally-spaced guides 17 on which a chuck 19 is slidably carried for generally vertical reciprocal movement. The chuck 19 is adapted to have a specimen 21 secured adjacent its forwardmost face.

Sectioning of the specimen 21 is accomplished by means of a cutting blade 23 disposed adjacent the movable chuck and specimen, the blade being supported in suspended relation from the top wall 25 of the housing, which top wall is slidable relative to the remainder of the housing so as to permit movement of the blade toward and away from the chuck. Means 27 are provided for effecting incremental sliding movement of the top wall 25 and cutting blade 23 toward the chuck 19 while simultaneously effecting vertical reciprocal movement of the chuck past the edge of the blade.

More specifically, the base 13 is formed of cast metal or the like and includes (FIGS. 3 and 4) a bottom wall 29, a side wall structure 31, a front wall 33, and a back wall 35. The side wall structure 31 includes an inner wall 37 extending upwardly from each of the lateral edges of the bottom wall 29, a narrow top wall 39 extending outwardly from the upper edges of the inner side walls 37, and an outer side wall 41 extending downwardly and slightly outwardly from the outer edge of each of the narrow top walls 39. The outer side walls 41 are of a somewhat greater length than the inner side walls 37 and serve to elevate the bottom wall 29 above the surface upon which it is supported. The entire side wall structure tapers abruptly forwardly near the forward portion of the base (FIG. 1) to form a pair of shallow parallel curbs 43 which extend to the forward edge of the bottom wall.

The back wall 35 of the base (FIG. 3) is essentially solid and extends across the entire rearward end of the base, while the front wall 33 is substantially shorter than the back wall and extends across the entire forward end of the base. The front wall 33 extends upwardly slightly adjacent each of its ends to cap the forward ends of the curbs 43. A recess 45 is formed in each of the front and rear walls of the base to provide a gripping area for persons desiring to carry the instrument.

The microtome 11 is supported on the base 13 with the lower supporting surface of the microtome resting upon the narrow top walls 39 of the side wall structure 31 and upon the upper surface of the back wall 35. Each of the top walls and back wall is provided with a ridge 47 (FIGS. 3 and 4) adjacent its outer edge to retain the microtome in place, and holes (not shown) are preferably provided in these surfaces to receive fasteners by means of which the microtome may be secured to the base.

When the microtome is supported on the base, the above-mentioned side and back walls of the base together with the bottom wall of the microtome define an open-ended compartment 49 (FIG. 3) which is adapted to receive a utility drawer 51 of conventional drawer design. The drawer 51 slides under the cuting blade 23 of the microtome, which blade is suspended from the top wall 25 of the housing, and receives unwanted particles shaved from the specimen. The curbs 43 serve as lateral guides to the sliding movement of the drawer 51.

The provision of such a drawer is a decided advantage in the use of the microtome since in the preparing of sections it is generally necessary to remove a number of slices from the specimen before a desired section can be taken. Such preliminary slices tend to accumulate around the cutting blade and present an unsightly appearance in conventional microtomes. In the disclosed construction, the fact that the cutting blade is suspended above the bottom wall of the base makes it possible to slide the drawer under the blade and catch the waste trimmings as they drop or are brushed from the blade.

The housing 15 of the microtome 11 (FIGS. 3 and 4) includes a bottom wall 53 and a pair of generally vertical side walls 55 projecting upwardly from its side edges and integral therewith. Each of the side walls 55 is offset inwardly adjacent its upper edge, the offset portion being enlarged somewhat to provide structural reinforcement for a lip 57 projecting laterally inwardly from the top wall 25, soon to be described. In this regard, the offset upper portion of each of the side walls is provided with a horizontally extending groove 59 defined by a generally flat horizontal wall 61, a generally vertical rear wall 63 and an upwardly and outwardly sloping upper wall 65. The groove 59 extends the length of the upper edge of the side wall, which upper edge is cut away adjacent its rearward edge to form a rectangular notch 67 which receives a forwardly extending hood 69 of the back wall 70, soon to be described.

The forward end of the housing 15 is provided with a forward wall 71 inset from the forward edges of the side walls 55 of the housing. The forward wall 71 comprises essentially (FIG. 3) a centrally disposed block 73 of somewhat lesser height than the side walls and connected to the side walls by webs 75 (FIG. 6) of somewhat greater height. The block 73 is provided with an axially horizontal longitudinally extending hole 77 within which a shaft 79 of the operating mechanism is journalled.

One of the guides 17 is disposed adjacent the forward edge of each of the side walls 55 of the housing, the guides being recessed in grooves 81 in the side walls, as seen in FIG. 6, and held in place by fasteners 83. Each of the guides comprises a bar of generally rectangular cross section which tapers to an edge 85 on one side. The guides are disposed with their tapered edges 85 facing each other and extending outwardly from the inner faces of the side walls. These projecting portions are received by grooves 87 of the movable chuck 19, to be described shortly, and insure that the chuck will always move in a fixed vertical plane.

The rearward end of the housing 15 is closed by the back wall 70 which is removably attached to the rearward ends of the bottom and side walls 53 and 55 respectively of the housing by fasteners 91. The rearward surface of the back wall 70 is provided with a somewhat circular recess 93, as shown by the dotted lines of FIG. 4, which extends over a substantial portion of the back wall and receives an adjusting wheel 95, soon to be described, which is journalled in an opening 97 in the back wall. This surface of the back wall is further recessed adjacent the center of the first mentioned recess, as at 99, to receive bearings and the like of the adjusting wheel. The hood 69 projects forwardly from the upper edge and upper portions of the side edges of the back wall. The hood occupies the notch 67 of the side walls 55, and the forward edge 101 of the hood serves as a stop for rearward movement of the top wall 25.

The top wall 25 of the microtome housing includes a flat plate 103 formed to provide a pair of depending side wall portions 105 (FIG. 4), each of which is flanged inwardly at its ends to provide the lip 57, previously referred to. The lip 57 carries a filler 107 of wear-resistant material having a sloping upper wall 109 which mates with the inclined wall 65 of the groove 59 of the side wall. The forward edge of the top plate is cut away somewhat near its center, as at 111, to provide clearance for an adjusting screw 113 of the movable chuck 19, and the lower surface of the top wall is recessed slightly adjacent its rearward edge, as at 115, and overhangs the hood 69 of the back wall 70. The forward edge of the groove serves as an abutment 117 which is engaged by the forward edge 101 of the hood to limit rearward movement of the top wall. A post 119 projects downwardly from the lower surface of the top plate 25 and includes a threaded hole 121 which receives a threaded bolt 123 of the advancing mechanism 27, described in detail shortly.

As previously mentioned, the sliding top wall of the microtome has suspended therefrom the cutting blade 23 by means of which the sectioning of the specimen is accomplished. The blade 23 is suspended such that it can be rotated for purposes of adjustment, about an axis colinear with its cutting edge, thus making it possible to vary the angle of the blade without affecting the distance between the cutting edge and the specimen.

Accordingly, in the illustrated embodiment, each side wall portion 105 of the top wall is extended adjacent its forward end to provide a downwardly and forwardly projecting arm 125, adjacent the lower ends of each of which one end of a cutting blade holder 127 is mounted. Each arm 125 of the top wall is provided with a transverse hole 129 immediately adjacent its lower end, that portion of the arm which defines the lower wall of the hole being cut away, however, to render the hole accessible from the bottom and leaving a pair of spaced-apart fingers 131. That portion of the arm above the hole is provided with a cut 133 which extends inwardly and upwardly of the arm to a point approximately midway of the length of the arm.

Each arm 125 of the top wall is therefore divided into a pair of spaced fingers 131, the inner surfaces of which define at their lower ends a transverse hole 129. The metal of the top wall is preferably sufficiently resilient that these fingers can be urged together to clamp a portion of the blade holder 127 within the hole 129 and, in this regard, a threaded opening 135 extends into the forward edge of each arm at an acute angle to the plane of the cut 133, through at least a portion of each finger 131, and receives a threaded fastener 137 which, when tightened, draws the fingers together to clamp the holder 127.

The knife blade holder (FIG. 8) includes a flat bar 139 of generally rectangular cross section having an upstanding bracket 141 secured to each of its ends by fasteners 143. Each bracket is of a generally triangular cross section, but includes an essentially cylindrical knob 145 at its apex or upper end, which knob is adapted to be journalled within the hole 129 in the lower end of one of the arms 125 of the top wall of the microtome and to rotate within the hole about its longitudinal axis. A flange 147 projects from each side edge of the bracket toward the opposite end of the bar and includes a threaded hole 149 to receive a set screw 151 by means of which the blade 23 may be secured in place.

Conventionally, the cutting blades utilized in microtomes are of triangular cross section and, in order to properly receive the cutting blade 23, each upstanding bracket 141 of the blade holder 127 is therefore provided with a generally triangular slot 153 which terminates at its upper end in a hole 155 the axis of which is colinear with the longitudinal axis of the cylindrical knob 145 located at the upper end of the bracket. The blade 23 fits rather closely within the triangular slot with its cutting edge positioned on the axis of the cylindrical knobs 145 and holes 155 within the knobs, any adjustments which may be necessary to achieve this relationship being effected by set screws 157 which extend upwardly through the rectangular bar of the blade holder.

Since the knobs 145 are journalled with the holes 129 of the arms 125 of the top wall and thus determine the axis of rotation of the blade holder 127, and the blade holder is constructed so that the cutting edge of the blade is colinear with the longitudinal axis of the knobs, the blade will thus rotate about an axis colinear with its cutting edge. This is of a decided advantage in the use of an instrument of this type, where the angle of the knife during the cut is critical and in which it may be necessary to change the angle repeatedly before the desired position is achieved. When the knife does not rotate about an axis colinear with its cutting edge, as is conventionally the case, the blade must be moved forward or backward as well as rotated for each adjustment. This is, of course, a time consuming process.

With the blade suspended from the top wall of the microtome, as in the present structure, it is easily swung about the axis colinear with its cutting edge and no elaborate supporting structure need be set up on the base of the microtome. The blade can be adjusted by merely loosening the fasteners 137 and tightening them when the blade is properly positioned. If desired, the adjustment may be made with the knife in close proximity to the specimen, so that the blade can be lined up precisely with the surface of the specimen, without danger of injuring or damaging the specimen.

Referring now in detail to the movable chuck 19 of the microtome, as seen best in FIGS. 3 and 5, the chuck comprises a generally rectangular solid block 159, each of the side edges of which is provided with one of the triangular grooves 87 to receive the inwardly projecting tapered edge 85 of one of the guides 17. A generally rectangular recess 161 is provided centrally of the forward face of the block to receive projecting portions of a specimen carrier 163, soon to be described, or to receive a specimen 21 otherwise mounted, as in a paraffin block or the like. The recess extends inwardly of the forward face a depth equal to about one-half the thickness of the block, and the upper edge of the rectangular recess is provided with a series of closely spaced triangular grooves 165 which extend parallel to the forward wall of the block and which provide a roughened surface which will intimately engage the surface of the specimen carrier or paraffin block and retain it securely in place.

The rearward face of the block 159 is provided with a horizontally disposed slot 167 which is adapted to receive a camming member 169 of the operating mechanism 27, to be referred to in more detail shortly.

The chuck 19 includes means for effecting a clamping of the specimen carrier 163 or paraffin block within the rectangular recess 161, the clamping being such that the force exerted by the clamping means is in the same direction as the force which is applied to the specimen by the blade 23 during the cutting operation. Accordingly, the forward portion of the upper edge of the block 159 is provided with an elongated trough 171 of rectangular cross section disposed with its longitudinal axis generally horizontal and with its opposite ends adjacent the side edges of the block. This upper trough is vertically aligned with the recess 161 and is of such a depth that it is separated from the upper wall of the recess by a substantial thickness of material 173. An elongated bar 175 of rectangular cross section is disposed within the upper trough 171 and is of such dimensions as to substantially occupy the trough while being capable of free vertical sliding movement therein.

The lower edge of the block 159 is also provided with a trough 177 which is similar to the upper trough 171 in the upper edge of the block and is in alignment therewith. However, the lower trough 177 is of a greater depth than the upper trough 171 and extends inwardly of the block a sufficient distance to communicate with the lower portion of the rectangular recess 161 provided in the forward face of the block. A lower bar 179 is disposed within the lower trough 177 and, when in position, defines the lower wall of the recess 161. The depth of the lower trough is such that when the lower bar 179 is in its uppermost position, it extends into the recess slightly such that its upper surface is slightly higher than the lower forward edge of the generally rectangular recess. The upper surface of the lower bar is provided with a series of parallel triangular grooves 180 similar to the grooves 165 of the upper wall of the recess 161.

Consequently, when a member is disposed within the rectangular recess, and is of substantially the same dimensions as the recess, it is possible for the lower bar to engage this member and exert a force thereupon.

In order that the lower bar 179 may be moved upwardly, therefore, into engagement with the lower surface of a member, specifically, the specimen carrier 163 or a paraffin-mounted specimen, disposed within the recess 161, an elongated vertically disposed hole 181 is provided on each side of the rectangular recess 161 and extends between the adjacent ends of each of the upper and lower troughs 171 and 177 respectively. The holes 181 are adapted to receive headed bolts 183 which extend through countersunk holes 185 provided in the lower bar 179 and which are threaded at their upper ends into threaded holes 187 provided in the upper bar 175, thereby rigidly interconnecting the upper and the lower bar and preventing relative displacement thereof in opposite directions. The elongated vertical holes 181 are countersunk at their lower ends to permit insertion of coil springs 189 which bias the lower bar 179 into its lowermost position, in which position the upper bar 175 rests on the bottom wall of the upper trough 171 and the lower bar 179 is suspended with its upper surface immediately beneath the lower forward edge of the rectangular recess 161 in the forward wall of the block.

The lower bar 179 is moved upwardly into engagement with the specimen carrier or paraffin block by means of the adjusting bolt 113, previously referred to, which is threaded at its lower end and extends through a threaded opening 191 in the upper bar 175 so as to engage the lower surface of the upper trough. The adjusting bolt 113 is suitably knurled at its upper end to facilitate manual turning thereof. It should be clear that when the bolt is rotated, the lower end of the bolt will engage the lower surface of the upper trough and elevate the upper bar 175. The connection between the upper and lower bars will then cause the lower bar 179 to be elevated as well, against the force of the biasing springs 189, and into engagement with the lower surface of the specimen carrier or paraffin block.

It will be seen, therefore, from the drawings, that the specimen carrier or paraffin block is held in place within the chuck by a force being in the same direction as the force exerted on the specimen carrier by the knife as it engages the specimen. With both forces being exerted in the same direction, there is less likelihood of the carrier being loosened within the chuck and a more reliable clamping action is thus achieved.

The specimen carrier 163 of the illustrated embodiment (FIG. 2) comprises a flat plate 193 of generally rectangular configuration but rounded corners, the outer face of the plate being suitably roughened or cross cut to facilitate the attachment thereto of a frozen specimen. A side wall 195 extends outwardly from the rearward surface of the plate adjacent each of the longitudinal edges thereof, these side walls being parallel and being horizontally disposed in upper and lower positions when the carrier is mounted within the chuck 19 of the microtome. When so mounted, the upper side wall engages the grooved upper surface of the rectangular recess 161 and the lower wall is engaged by the upper surface of the movable lower bar 179, thereby clamping the carrier within the chuck. The outer surface of each of the side walls is provided with a plurality of parallel triangular grooves 197 normal to the flat plate to ensure effective contact between the surface of the wall and the corresponding adjacent surface of the bars of the chuck.

The operating mechanism 27 of the improved microtome effects reciprocal movement of the chuck 19 while simultaneously causing incremental sliding movement of the top wall 25 in a direction which will bring the cutting blade 23 into proximity with the chuck. Preferably, the incremental movement of the top wall occurs while the chuck is at the top of its stroke, and is of a distance equal to the desired thickness of the section which is being cut.

Very generally, the operating mechanism 27 comprises the main driving shaft 79 rotatably mounted within the housing and operationally connected to the chuck 19 adjacent one of its ends. The opposite end of the shaft 79 is located in spaced relation to the back wall 70 of the housing and connected through a ratchet mechanism 199 (FIG. 4) to the threaded bolt 123 which controls incremental slidable movement of the top wall 25. The main driving shaft 79 is itself manually driven through a gear connection by means of a wheel crank 201 disposed adjacent a side wall of the housing.

More specifically, the main driving shaft 79 extends longitudinally of the housing through the center thereof and is journalled adjacent its forwardmost end in hole 77 of the block 73 which forms the central portion of the forward wall 71 of the housing. The hole 77 of the block is suitably lined with a bushing 203 to facilitate rotation of the shaft therein, the bushing being flanged at its rearward end to maintain it in place. The shaft 79 projects somewhat forwardly of the forward face of the block 73 into a limited space 205 intermediate the forward wall of the housing and the chuck 19.

Rotation of the driving shaft 79 imparts vertical reciprocal movement to the chuck 19 through a linkage comprising a flat bar 207 having a pair of spaced holes 209 and 211 extending therethrough adjacent its opposite ends. One of the holes 209 is adapted to receive and be keyed to the forward end of the shaft 79, while the hole 211 at the opposite end of the bar is adapted to receive the rearward end of a dowel 213 having a radially projecting flange 215 extending outwardly therefrom at approximately its longitudinal center. The dowel 213 is journalled within the camming block 169 of nylon or the like which rides within the slot 167 in the rearward face of the chuck.

As can be seen in FIGS. 3 and 5, as the driving shaft 79 rotates, it causes the nylon block 169 to move in an arc and thus to be raised and lowered. Accordingly, the block 169, which moves in the slot 167 in the chuck 19, also causes the chuck to be raised and lowered and to undergo vertical reciprocal movement on the guides 17 of the side walls of the microtome. With the nylon block 169 moving in an arc, as in the illustrated embodiment, the movement of the chuck is not uniform but rather moves rapidly when passing the mid point of its stroke and more slowly at the extremities of its stroke. Accordingly, there is relatively little movement of the chuck during the portion of the cycle in which the cutting blade is advanced.

It should also be noted that the proximity of the journal of the main drive shaft 79 to the movable chuck 19, and the relatively short connection between the shaft and the chuck, permits very little lost motion between the two as contrasted with a number of conventional microtomes in which the driving connection is so remote as to permit an undesirable amount of play and slack in the system. Such slack and play prevents the slicing of a specimen of uniform thickness and is therefore undesirable.

The main driving shaft 79 is itself rotated by means of a geared connection to the hand-driven wheel crank 201. More specifically, the shaft 79 has keyed thereto a sleeve 217, the forwardmost end of which abuts the rearward end of the flanged bushing 203 of the block 73 of the forward wall 71. The rearward end of the sleeve 217 is provided with teeth to form a bevel gear, which teeth are engaged by teeth of a similar sleeve 219 keyed to a shaft 221 projecting through the right side wall of the housing (FIG. 6) with its axis normal to the axis of the main driving shaft 79. The wheel crank 201 is keyed to the outer end of the shaft 221 to facilitate rotation thereof.

As previously mentioned, the main driving shaft 79 extends inwardly of the housing with its rearward end disposed adjacent to but spaced from the back wall 70 of the housing. The rearward end of the shaft is provided with a pin 223 (FIGS. 3 and 4) which projects radially therefrom and engages a portion of the ratchet mechanism 199 each time the shaft 79 undergoes a complete rotation.

The ratchet mechanism 199 serves to effect incremental sliding movement of the top wall of the housing by effecting incremental rotation of the bolt 123, previously referred to, which is journalled adjacent its rearward end in the back wall 70 of the housing and which extends through the back wall and has keyed to its rearward end the adjusting wheel 95, previously referred to. The forward end of the bolt 123 is threaded and extends forwardly of the back wall through the threaded hole 121 of the post 119 which depends from the top wall 25. Rotation of the bolt 123, therefore, causes linear sliding movement of the top wall and, hence, movement of the cutting blade. This rotation of the bolt 123 may be effected by either manual rotation of the adjusting wheel 95, by which rapid rotation of the bolt and, hence, substantial movement of the cutting blade is possible, or by the ratchet mechanism 199, which causes incremental movement of the blade.

Referreing now more specifically to the details of construction of the ratchet mechanism 199, a finely toothed disk or ratchet 225, is keyed to the bolt 123 intermediate the back wall 70 of the housing and the depending post 119 of the top wall, rotation of the ratchet being effective to cause rotation of the bolt 123. Disposed immediately forwardly of the ratchet is a pawl arm 227 (FIG. 4) which is generally in the form of a flat plate having a central opening 229 defined by a ring 231 of a metal such as bronze. The ring is enlarged adjacent one edge and provided with an opening 233 large enough to accept the bolt 123, from which it is suspended for free swinging movement. An opposite edge of the ring 231 is enlarged to permit attachment thereto of a pawl 235, soon to be described. A biasing spring 237 extends between the pawl arm and a hook 239 extending from the side wall of the housing.

It will be seen, therefore, that the pawl arm 227 is free to swing about the bolt 123, but that it is biased for swinging movement in a clockwise direction. Swinging movement of the pawl arm in the counterclockwise direction is accomplished by the pin 223 which projects radially from the main driving shaft 79 and is located within the central opening 229 of the ring 231 so as to engage the inner surface of the ring as the shaft 79 rotates. In this regard, the opening 229 of the ring is provided with a flat portion 240 on one side to permit engagement by the pin 223 while not allowing engagement between the pin and the opposite sides of the ring (FIGS. 4 and 9). Accordingly, the pin 223 engages the flat of the ring just long enough to cause it to swing briefly in a counterclockwise direction and then be released for biased return in the opposite direction.

The swinging motion of the pawl arm 227 is transmitted to the ratchet disk 225 by the pawl 235 which is carried on the pawl arm. The pawl comprises a somewhat U-shaped member pivotally connected to the pawl arm 227 adjacent the lower end of one of the arms 241 of the pawl, the other arm 243 of the pawl being inclined somewhat relative to the first arm and being tapered at its end for engagement with the toothed edge of he rachet. The pawl is biased for roation in a counterclockwise direction about its pivotal connection to the pawl arm by the spring 237, (FIG. 9), this rotation being such as to bring the tapered edge of the arm 243 into engagement with the edge of the ratchet disk 225. A pin 247 limits this rotation, however, to prevent displacement of the pawl thereof, as when the pawl is disengaged from the ratchet for purposes which will soon become apparent.

The pawl 235 is so positioned that it engages the ratchet disk 225 as the pawl arm swings in a counterclockwise direction (FIG. 4), but will slip along the teeth of the ratchet as the pawl arm swings back in a clockwise direction. Hence, the pawl engages the ratchet during the driven movement of the pawl arm rather than during its biased movement.

The amount of rotation of the ratchet is determined by the degree of driven swinging movement of the pawl arm 227 between its initial or starting position and its final position, which final position is determined by the length of the driving pin 223 and its position relative to the flat portion 240 of the pawl arm. Since the final position of the pawl arm is therefore fixed for any given length of pin 223 and relative position of shaft 79 and pawl arm, variation of the degree of swinging movement is best accomplished by varying the initial position of the pawl arm, i.e., the position from which it begins its counterclockwise driven movement. This is accomplished in the illustrated embodiment by providing an adjustable stop post 249 which extends inwardly of the side wall of the housing a sufficient distance to engage a side edge of the pawl arm 227 and limit its biased swinging movement in the clockwise direction. The adjustable post includes (FIG. 9) an inner screw 251 which advances inwardly of the housing or is withdrawn from the housing upon rotation thereof, the degree of rotation of the bolt 123, the movement of the cutting blade 23 and, hence, the thickness of the section sliced from the specimen all being directly related to the position of the screw.

The adjustable post is calibrated, as seen in FIG. 7, to provide the technician with an accurate determination of the thickness of the slices which will be produced, A ring or washer is affixed to the inner end of the post to prevent it from being completely withdrawn from the side wall.

It should be noted that rotation of the wheel crank in either direction will produce a vertically reciprocal movement of the chuck and advancement of the cutting blade, since both are dependent upon a mere rotation of the main driving shaft regardless of the direction. Hence, whenever the wheel crank 201 is rotated, the knife blade will always advance, and can be withdrawn in a direction away from the specimen, as when a new specimen is mounted, through the use of the adjusting wheel 95, which must then be rotated in a clockwise direction (FIG. 4). However, as will be seen from the drawing, rotation of the adjusting wheel in the clockwise direction will tend to rotate the ratchet in the clockwise direction as well, which rotation will be resisted by engagement of the pawl with the teeth of the ratchet. Hence, it is desirable to disengage the pawl from the ratchet to permit the ratchet to so rotate.

This is accomplished in the illustrated embodiment, as seen in FIG. 9, by providing the adjustable post 249 with a release mechanism which permits it to be projected a substantial distance forwardly to force the pawl arm toward the right (FIG. 4), at which position the pawl will not engage the teeth of the ratchet and in which position the pawl will be held from pivotal movement by means of the pin 247 and the spring 245.

More specifically, the adjustable post 249 comprises a bushing 253 fixed within the wall of the housing and having internal threads at its innner end which receive the threaded innermost end of the screw 251. A cap 255 is secured to the outer end of the adjusting screw and is flanged at its edges to encircle the walls of the bushing. The adjusting screw itself carries within it a pin 257 which extends through the center of the screw 251 and cap 255 coaxial therewith and projects outwardly from each end of the screw. The pin 257 is biased toward the cap 255 by a coil spring 259 located within the screw which bears against a shoulder of the pin.

When it is desired to disengage the pawl 235 from the ratchet 225, the pin 257 within the post 249 is urged forwardly to the dotted line position shown in FIG. 9 against the force of the spring 259, and rotated slightly to lock it in place. This is accomplished, in the illustrated embodiment, by providing the pin with a dowel 261 passing transversely therethrough and projecting slightly therefrom at each of its ends. The cap is slotted, as at 263, to receive the dowel, the slot 263 being formed at its inner end, adjacent the outer end of the screw 251, to permit rotation of the pin and receive the dowel in a second slot 265 normal to the axis of the pin. This is seen most clearly in FIGS. 10 and 11.

With the pin thus extended, the pawl 255 is disengaged from the ratchet, it is possible to rotate the ratchet in either direction so as to rapidly position the cutting blade in the desired position, and to thereafter retract the pin so as to permit the incremental feeding of the cutting blade during the operation of the microtome.

While various structural features have been shown and described, it should be apparent that various modifications may be made therein without departing from thes cope of the invention.

What I claim is:

1. A microtome comprising a walled housing having a top wall slidably movable in a generally horizontal plane, an upstanding wall of said housing being provided with an elongated generally vertically disposed opening, a pair of vertically disposed, horizontally spaced guides positioned adjacent said opening, a specimen carrier positioned within said opening and having a specimen-receiving surface, said specimen carrier being positioned for reciprocal sliding movement on said guides so as to move said specimen-receiving surface in a generally vertical plane, a knife suspended from said top wall of said housing in adjacent relation to said specimen-receiving surface, said knife including a cutting edge disposed in generally parallel relation to said specimen-receiving surface, and means within said housing for effecting reciprocal movement of said specimen carrier and for effecting incremental sliding movement of said top wall of said housing incident to said reciprocal movement of said specimen carrier such as will move said knife in the direction of said specimen-receiving surface.

2. A microtome comprising a walled housing having a top wall slidably movable in a generally horizontal plane, an upstanding wall of said housing being provided with an elongated generally vertically disposed opening, a pair of vertically disposed, horizontally spaced guides positioned adjacent said opening, a specimen carrier positioned within said opening and having a specimen-receiving surface, said specimen carrier being positioned for reciprocal sliding movement on said guides so as to move said specimen-receiving surface in a generally vertical plane, means for effecting said reciprocal movement of said surface, a knife suspended from said top wall of said housing in adjacent relation to said specimen-receiving surface, said knife including a cutting edge disposed in generally parallel relation to said specimen-receiving surface, a receptacle in the form of a sliding drawer positioned beneath said knife for receiving materials trimmed from the specimen, and means for effecting incremental sliding movement of said top wall of said housing such as will move said knife in the direction of said specimen-receiving surface.

3. A microtome comprising a specimen carrier having a specimen-receiving surface adapted for generally vertical reciprocal movement in a fixed plane, means for effecting said reciprocal movement of said specimen-receiving surface, a knife-carrying member mounted for sliding movement in a generally horizontal plane, arm members projecting outwardly from said knife-carrying member in horizontally spaced relation to one another, a knife blade support carried intermediate said arms and adapted for pivotal movement about a horizontal axis, and a knife blade mounted on said support and positioned with its cutting edge colinear with said pivotal axis of said support.

4. A microtome comprising a specimen-carrier having a specimen-receiving surface adapted for generally vertical reciprocal movement in a fixed plane, means for effecting said reciprocal movement of said specimen-receiving surface, a knife-carrying member mounted for sliding movement in a generally horizontal plane, arm members projecting outwardly from said knife-carrying member in horizontally spaced relation to one another, a knife blade support carried intermediate said arms and adapted for pivotal movement about a horizontal axis, a knife blade mounted on said support, and means for positioning said blade such that its cutting edge is colinear with said pivotal axis of said support.

5. A microtome comprising a specimen-carrier having a specimen-receiving surface adapted for generally vertical reciprocal movement in a fixed plane, means for effecting said reciprocal movement of said specimen-receiving surface, a knife-carrying member mounted for sliding movement in a generally horizontal plane, arm members formed of a resilient material projecting outwardly from said knife-carrying member in horizontally spaced relation to one another, each of said arm members including an axially horizontal hole extending therethrough, said holes being coaxial with one another and said arms being cut-away to permit entry into said hole adjacent the lower end thereof, each of said arms being provided with a slot extending from said hole inwardly of said arm so as to provide a pair of resilient fingers, a knife blade support carried intermediate said arms and adapted for pivotal movement about a horizontal axis, said knife blade support including a cylindrical member adjacent each end adapted to occupy one of said holes of said arm members so as to permit rotation of said member within said holes, and a knife blade mounted on said support and positioned with a cutting edge colinear with said pivotal axis of said support.

6. A microtome comprising a knife-carrying member mounted for sliding movement along a fixed path in a generally horizontal plane, means on said knife carrying member defining a threaded opening having an axis parallel to the path of movement of said member, a finely threaded first shaft disposed within said threaded opening and stationarily mounted relative to said member for rotational movement, and means for effecting incremental rotational movement of said first shaft so as to effect incremental sliding movement of said knife carrying member along said fixed path, said means including a ratchet disk keyed to said first shaft, a pawl arm mounted on said shaft adjacent said ratchet disk for swinging movement in an arc between a first position and a given second position, said pawl arm including a camming surface, and a pawl pivotally mounted on said pawl arm and engageable with the teeth of said ratchet, said pawl being disposed such that swinging movement of said pawl arm in one direction is effective to cause said pawl to engage the teeth of said ratchet disk and cause rotation thereof, while return swinging movement in the opposite direction permits said pawl to slip over said teeth and not effect rotation of said ratchet disk, means for causing swinging movement of said pawl arm in said one direction including a rotatable second shaft having a camming pin projecting radially therefrom and positioned so as to engage said camming surface of said pawl arm when said second shaft is rotated, means for biasing said pawl arm for swinging movement toward said first position, and means for biasing said pawl into engagement with said teeth of said ratchet.

7. A microtome comprising a knife-carrying member mounted for sliding movement along a fixed path in a generally horizontal plane, means on said knife-carrying member defining a threaded opening having an axis parallel to the path of movement of said member, a finely threaded first shaft disposed within said threaded opening and stationarily mounted relative to said member for rotational movement, and means for effecting incremental rotational movement of said first shaft so as to effect incremental sliding movement of said knife-carrying member along said fixed path, said means including a ratchet disk keyed to said first shaft, a pawl arm mounted on said first shaft adjacent said ratchet disk for swinging movement in an arc between a first position and a given second position, said pawl arm comprising a ring having an internal camming surface, and a pawl pivotally mounted on said pawl arm and engageable with the teeth of said ratchet, said pawl being disposed such that swinging movement of said pawl arm in one direction is effective to cause said pawl to engage the teeth of said ratchet disk and cause rotation thereof, while return swinging movement in the opposite direction permits said pawl to slip over said teeth and not effect rotation of said ratchet disk, means for causing swinging movement of said pawl arm in said one direction including a rotatable second shaft extending through said ring of said pawl arm having a camming pin projecting radially therefrom and positioned so as to engage said internal camming surface of said ring when said second shaft is rotated, means for biasing said pawl arm for swinging movement toward said first position, means for biasing said pawl into engagement with said teeth of said ratchet, and means for disengaging said pawl from said ratchet so as to permit rotation of said ratchet in either direction.

8. A microtome comprising a support, a knife-carrying member mounted for sliding movement on said support, a knife supported by said knife-carrying member for pivotal movement about an axis colinear with the cutting edge of said knife, a pair of stationary guides supported adjacent said knife, a chuck positioned for vertically reciprocal movement on said guides with one face thereof adjacent said knife blade, said chuck being adapted to receive a specimen-retaining means adjacent said one face in a clamping engagement in which the force exerted on said specimen-retaining means is in the same direction as the force exerted by said knife during the cutting of said specimen, a first shaft rotatably journalled adjacent the opposite face of said chuck and connected thereto such that rotation of said first shaft causes vertical reciprocal movement of said chuck, and means for effecting incremental sliding movement of said knife-carrying member while simultaneously causing vertical reciprocal movement of said chuck, said means comprising a second and threaded shaft engageable with said knife-carrying member and adapted to effect linear movement of said member when rotated, a ratchet disk keyed to said second shaft, a pawl arm mounted on said second shaft adjacent said ratchet disk for swinging movement between a first position and a given second position, and a pawl pivotally mounted on said pawl arm and engageable with the teeth of said ratchet, said pawl being disposed such that swinging movement of said pawl arm in one direction is effective to cause said pawl to engage the teeth of said ratchet disk and cause rotation thereof, while return swinging movement in the opposite direction permits said pawl to slip over said teeth and not effect rotation of said ratchet disk, means connected to said first shaft for causing swinging movement of said pawl arm in said one direction, and means for effecting return movement of said pawl arm in said opposite direction.

9. A microtome comprising means defining a pair of vertically disposed, horizontally spaced guides, a chuck positioned intermediate said guides and slidable thereon for reciprocal movement in a generally vertical plane, said chuck being adapted to receive a specimen retaining means having a specimen-receiving surface and an upper and a lower outwardly directed surface, said chuck including a generally rectangular block having a generally rectangular recess in one vertical face thereof of sufficient size to receive both said upper and said lower outwardly directed surfaces of said specimen-retaining means, an elongated horizontally disposed trough extending upwardly from the lower surface of said block into communication with the lower portion of the said recess and in communication with said lower surface of said specimen-retaining means when said upper and lower outwardly directed surfaces thereof are disposed within said recess, an elongated bar disposed within said trough for engagement with said lower surface of said specimen-retaining means, means for effecting upward movement of said bar so as to cause said bar to engage said lower surface of said specimen-retaining means and clamp said specimen-retaining means within said recess, means for effecting said reciprocal sliding movement of said chuck, a knife-carrying member mounted for sliding movement in a generally horizontal plane, a knife supported by said knife-carrying member in adjacent relation to said specimen-receiving surface, said knife including a cutting edge disposed in generally parallel relation to said specimen-receiving surface, and means for effecting incremental sliding movement of said knife-carrying member such as will move said knife in the direction of said specimen-receiving surface.

10. A microtome comprising a knife blade, a chuck adapted to support a specimen carrier having a specimen affixed thereto and means mounting said blade and chuck for relative movement in directions effective to cause engagement of said blade and a specimen thus supported and cutting of a section from said specimen, said chuck having a body including an integral first wall member, a movably mounted second wall member in opposing relation with respect to said first wall member and spaced therefrom, and means for urging said second wall member toward said first wall member for clamping engagement of a specimen carrier therebetween, said chuck being oriented with respect to said blade such that said cutting of a section from said specimen exerts forces urging the specimen carrier against said first wall member in reinforcement of the clamping forces applied to said specimen carrier by said second wall member.

11. A microtome in accordance with claim 10 wherein the said first wall member is defined by the upper surface of a recess provided in one vertical face of a generally rectangular block comprising the chuck, said recess being of sufficient size to receive an engageable portion of the specimen carrier, and wherein said second wall member is defined by the upper surface of an elongated bar disposed within an elongated horizontally disposed trough extending upwardly from the lower surface of said block into communication with the lower portion of said recess.

12. A microtome in accordance with claim 11 wherein said means for effecting upward movement of said lower elongated bar comprises an upper elongated bar disposed within an upper trough extending downwardly from the upper surface of the block, said upper bar being connected to the said lower bar of said lower trough, and means for effecting upward movement of said upper bar of said upper trough so as to cause upward movement of said lower bar so as to cause same to engage said specimen carrier.

References Cited by the Examiner

UNITED STATES PATENTS

| | | | |
|---|---|---|---|
| 775,556 | 2/04 | Dieckman | 83—699 X |
| 930,686 | 8/09 | Patterson | 83—409 |
| 1,026,280 | 5/12 | Ott | 83—409 |
| 1,311,986 | 8/19 | Miles | 269—253 |
| 1,470,265 | 10/23 | Holmes | 269—56 |
| 1,513,093 | 10/24 | Denne | 83—409 X |
| 1,598,703 | 9/26 | Berthon | 269—56 |
| 2,155,523 | 4/39 | Bausch et al. | 83—915.5 X |
| 2,212,953 | 8/40 | Popp et al. | 83—915.5 X |
| 2,343,391 | 3/44 | Wachsman | 269—252 X |
| 2,822,726 | 2/58 | Blum | 83—915.5 X |
| 2,868,072 | 1/59 | Weiskopf | 83—915.5 X |
| 2,952,372 | 9/60 | Foss | 83—167 X |
| 3,103,844 | 9/63 | Persson | 83—167 |

ANDREW R. JUHASZ, *Primary Examiner.*

WILLIAM W. DYER, Jr., *Examiner.*